Figure 1:
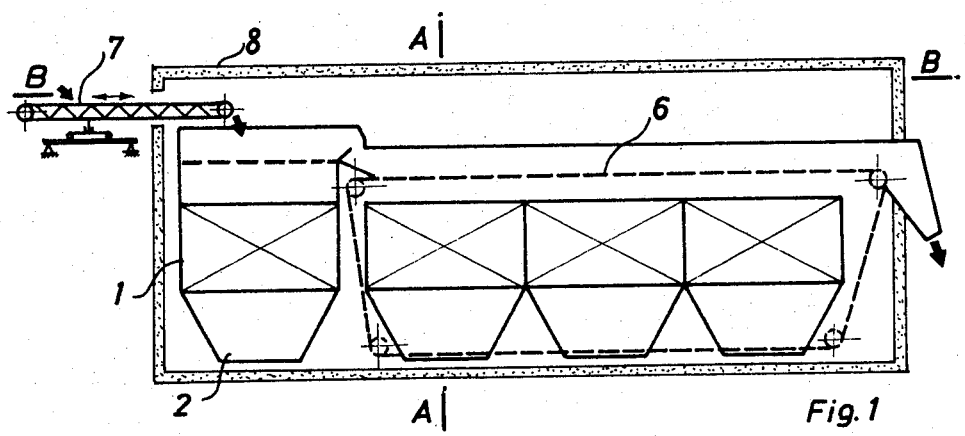

United States Patent [19]

Gruda et al.

[11] 4,283,923
[45] Aug. 18, 1981

[54] METHOD OF CONTINUOUS FREEZING OF FOOD PRODUCTS IN BULK, ESPECIALLY OF FRUITS AND VEGETABLES, AND AN APPARATUS FOR APPLICATION OF THE METHOD

[76] Inventors: Zbigniew Gruda, Al. Niepodległości 159/69; Wiesław Kurzeba, ul. Gorlicka 11/40, both of Warszawa, Poland

[21] Appl. No.: 58,343

[22] Filed: Jul. 17, 1979

[30] Foreign Application Priority Data

Aug. 22, 1978 [PL] Poland .................................. 209192

[51] Int. Cl.³ .............................................. F28G 1/00
[52] U.S. Cl. ................................... 62/303; 62/57; 62/380
[58] Field of Search ................... 62/57, 65, 380, 266, 62/303

[56] References Cited

U.S. PATENT DOCUMENTS

| | | | |
|---|---|---|---|
| 3,115,756 | 12/1963 | Overbye | 62/65 |
| 3,139,739 | 7/1964 | Robinson | 62/303 |
| 3,302,423 | 2/1967 | Morrison | 62/266 |
| 3,817,370 | 6/1974 | Cox | 198/609 |
| 3,864,931 | 2/1975 | Guttinger | 62/65 |
| 3,982,404 | 9/1976 | Overbye | 62/65 |
| 4,062,202 | 12/1977 | Cloudy | 62/380 |

FOREIGN PATENT DOCUMENTS

| | | | |
|---|---|---|---|
| 66929 | 3/1973 | Poland . | |
| 1303972 | 1/1973 | United Kingdom | 62/57 |

*Primary Examiner*—Ronald C. Capossela

[57] ABSTRACT

Freezing in streams of cooled air is carried out at two stages, whereof the first one whose purpose consists in superficial preliminary freezing of the product proceeds in a fluidic bed, and the second one consisting in deep freezing proceeds on a grid conveyor. The fresh product fed to the fluidic bed is spread uniformly over its surface. The grate of the fluidic chute is provided with cleaning combs preventing the possibility of the particles of the product freezing to the chute.

4 Claims, 8 Drawing Figures

METHOD OF CONTINUOUS FREEZING OF FOOD PRODUCTS IN BULK, ESPECIALLY OF FRUITS AND VEGETABLES, AND AN APPARATUS FOR APPLICATION OF THE METHOD

A method of continuous freezing of food products in bulk, especially of fruits and vegetables, and an apparatus for application of the method.

The subject of the invention is a method of continuous freezing of food products in bulk, especially of fruits and vegetables, and an apparatus for application of the method.

There are known methods of freezing of food products in bulk by means of cooled air blown from below upwards through a layer of a product to be frozen. Such methods are effected in apparata of a tunnel type, wherein at one end a fresh product is fed and at the other end the frozen product is collected. Inside the tunnel the product is transported in a fluidization-type chute provided with a perforated bottom, or on a grid conveyor. In both cases cooled air flows through the layer of the product.

Air in the tunnel formed by a thermally insulated housing is in a circulation forced by fans which suck in the air from the insulated space and then pump it through coolers and a layer of the product.

From the British Pat. No. 1,303,972 there is known a method of and an apparatus for a fluidization-type freezing of food products in bulk, wherein the whole freezing process, i.e. both preliminary freezing and freezing-up, is effected on the principle of complete fluidization. The apparatus for application of said method is designed in the form of a chute with a perforated bottom through which cooled air is blown from below upwards. The food product is fed to the chute at its front end, wherefrom on the principle of complete fluidization it flows, being frozen on its way, to the opposite end of the chute, where a pour-over threshold is fixed. The method provides for good freezing of hard products such as green pea, bean, chips, diced carrot. At freezing of soft products such as strawberries, raspberries, soft cooking products, particles are damaged in a result of the process of complete fluidization lasting longer than ten minutes. In case of very soft and wet products such as, for example, fresh strawberries, the fresh product collects at the place of charging. Wet and heavy particles do not flow all over the whole surface of the bed, but form a cone which settles down on the bottom of the chute and freezes fast to the bottom. Sharp streams of air which run from the bottom of the chute tear up the soft particles, and then the torn-up product glues up the holes in the bottom, thus impeding the process of fluidization at that place. In a result, at the place of charging a block of torn-up particles is formed which is strongly frozen to the bottom. Said block accumulates along the chute and must be periodically knocked off, otherwise it would stop completely the operation of the apparatus.

The above described phenomenon causes considerable losses of the product in a result of damages, and the output of the apparatus decreases evidently as the quality of the product becomes worse.

Another disadvantageous phenomenon observed in said apparata is the pressing-in of the product under the base of a slant top wall of the chute during the oscillating motion of the chute. A crushed mass of the product is then pressed by the perforated bottom of the chute and falls down onto evaporators, whereon it freezes over in the form of a block.

From the Polish Pat. No. 66,629 and the U.S. Pat. No. 3,115,756 there are known apparata for freezing of food products in bulk, wherein the process of preliminary freezing and freezing-up is effected on belt conveyors situated one after the other or one over the other. On the first conveyor preliminary freezing occurs, on the second one freezing-up occurs, but the conditions of realisation of the process are the same at both stages, i.e. they include blowing of cooled air from below upwards through a motionless layer. This has grave consequences for the operation of the apparatus, the final quality of the product and the output of the apparatus. Particles of a wet and sticky product which lie motionless on the conveyor freeze strongly to it, and a knife fixed at the end of said conveyor cuts them off, causing considerable losses of the product and a decrease of its commercial value. Besides, said conveyor gums up considerably and therefore requires frequent or continuous washing which is a laborious and a power-consuming operation.

Another disadvantageous phenomenon is insufficient preliminary freezing of particles on the first conveyor. In a result of sticking of the particles to the conveyor and a fact that they do not loosen and move, the heat exchange between the product and a cooling medium is insufficiently intensive. As a result, the product is not frozen over the whole of its surface, falls partially wet and sticky onto the second conveyor, and during the further process of freezing-up it sticks together and gets clotted, which considerably worsens the heat exchange at the second stage as well. As a result, the output of the apparatus is relatively low, and underfreezing is frequently observed. In other known apparata of this type the process of preliminary freezing and freezing-up is effected on one belt conveyor, with a similar blowing-through of air from below upwards. Wet products freeze in said apparata in the form of a compact hard block which, after being torn off from the conveyor, is broken to pieces in special crushers, this being accompanied by considerable damages and losses of the product. In such apparata the underfreezing of particles occurs even more evidently.

In a result of observations and an analysis of the known methods and freezing apparata, the observations have been made which have contributed to designing of the invention whose object is to avoid the aforementioned problems, to eliminate or to limit the damages and the losses of the product considerably, and to increase the output of the freezing apparata.

It has been found out, among others, that in fluidization freezing of food products—which are usually wet during the process of preliminary washing—two stages can be distinguished: the first stage consisting in preliminary freezing of the surfaces of the particles, and the second stage consisting in freezing-up of the particles. Both stages have their own specific character and requirements referring to the technology of the process.

During the first stage the outer surfaces of the particles are preliminary frozen to the depth of 1-2 mm, due to which wet—and sometimes even sticky and soft—particles become dry, loose and slightly hardened. This prevents their sticking together and their getting clotted at the stage of freezing-up. In order to make said process proceed properly, a considerably intensive heat exchange is necessary between the cooling medium being the air, and the product to be frozen. Besides, particular particles of the product should be in continuous motion. Such conditions are fulfilled by a complete fluidization of the particles in a stream of cooled air.

At the second stage the particles must be frozen-up to a required low temperature, according to technological requirements. At this stage an intensive heat exchange between the particles and the medium is also necessary, but the motion of the particles is not required, since after freezing at the first stage they are not in danger of sticking together or getting clotted, even in case of a relatively thick layer. For the purpose of an intensive heat exchange in case of loose, i.e. unclotted particles, a blowing-through of the layer with cooled air is sufficient from below the layer upwards, said blowing-through being sufficiently strong so as to cause a slight fluffying of the layer, but without any motion of the particles. The said state is determined as a prefluidic state. As the examinations have proved, the conditions of the heat exchange are then even more advantageous than at complete fluidization, and an intensive long-lasting motion and mixing of particles are avoided, which in case of particularly soft and delicate products is an undesirable phenomenon causing abrasion and damage of the surface of the product.

According to the invention, the aforesaid object has been attained due to the fact that the freezing process consisting in blowing of cooled air from below upwards through a layer of the product to be frozen which is supported by an openwork base is carried out in two separate stages succeeding each other, wherein the first stage whose purpose is only to carry out preliminary freezing of the particles of the product proceeds in a fluidic bed, and deep freezing constituting the second stage proceeds in conditions of an intensive blowing-through of air, but below the fluidization limit. The continuously fed fresh product, which at the first stage of the process is subjected to freezing, is spread uniformly over the initial part of the surface of the fluidic bed. For the application of the method according to the invention an apparatus is used which is fed by means of a belt conveyor and which is provided with a thermally insulated housing containing a series of repeatable units consisting of an air cooler, an air-box and a fan causing the motion of air through the air-box and the air cooler in the upward direction. At least on the first unit, counting from the inlet of fresh air, a fluidic chute is situated which is fed with the fresh product by means of a belt conveyor which is mounted slidably and can preferably rotate. The conveyor is connected with a mechanism which puts it in a to-and-fro motion along the axis of the chute, and preferably in a rotary motion, in a horizontal plane, within the limits of the angle $\alpha$ included between the arms of a hypothetical isosceles triangle, whose base is approximately equal to the width of the fluidic chute, and whose height corresponds with the distance between the axis of rotation of the conveyor and its end. The fluidic chute, at least in its front part, is in the form of a grate made of wires, whereunder a system of slidable cleaning combs is mounted, the teeth of said combs being preferably made of plastics. Said teeth enter the spaces between the wires of the grate from below. The cleaning combs are arranged on rolls and provided with a bar connected with a driving mechanism which is situated outside the insulated housing, whereas said bar serves for shifting the cleaning combs to and fro along the axis of the chute. The top slant wall located at the front of the fluidic chute is provided with a comb from below, the teeth of said comb entering from below the spaces between the wires of the grate which constitutes the bottom of the chute. All repeatable units situated inside the housing of the apparatus—except for the units co-operating with the fluidic chute—are connected functionally with the grid conveyor whose beginning is situated in a cascade arrangement in relation to the fluidic chute and directly behind its pour-over threshold.

Figure 2:
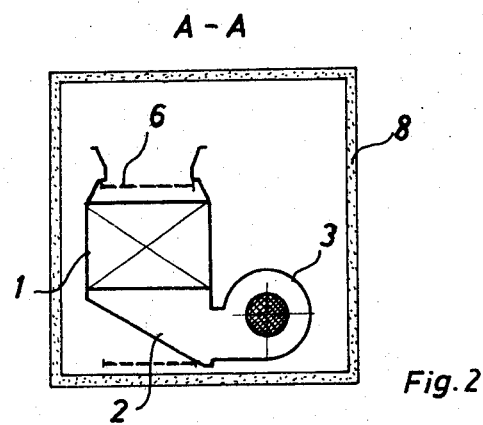
Figure 3:
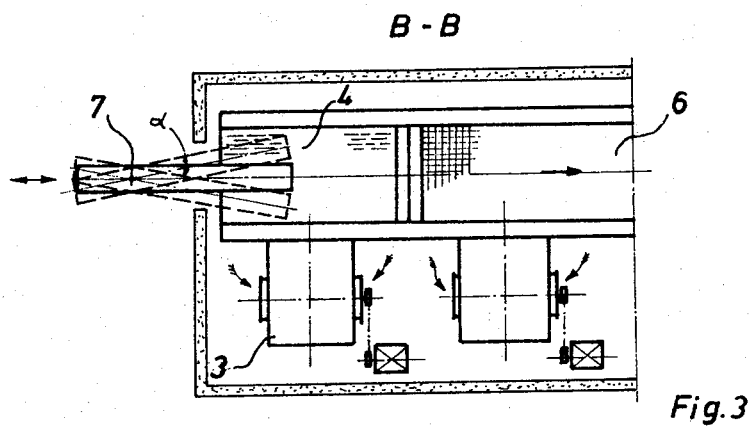
Figure 4:
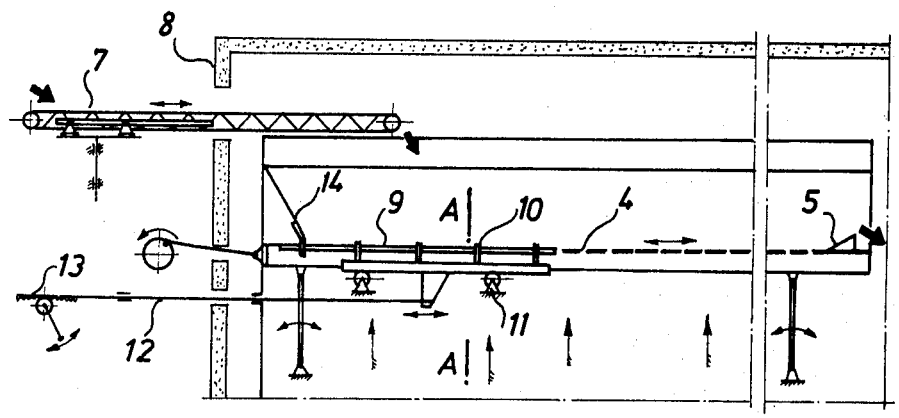

The realisation example of the apparatus for an application of the method according to the invention is illustrated in the drawing attached herewith, wherein FIG. 1 shows a diagrammatic longitudinal section, FIG. 2 shows a cross-section along the line A—A, as marked in FIG. 1, FIG. 3 shows a fragment of the top view from the side of the section B—B, as marked in FIG. 1, FIG. 4 shows a vertical section of the fluidic chute together with the equipment for its cleaning and putting in motion, and FIGS. 5, 6, 7 and 8 show the details marked in FIG. 4 in general outline only.

As it is shown in the drawing, the apparatus consists of several air coolers 1 connected with a cooling aggregate, not shown in the drawing. The coolers are arranged on air-boxes 2 attached to pumping pipes of fans 3.

The coolers 1 and the air-boxes 2, together with the fans 3, form repeatable units. Over the first one of said units, counting from the side of the inlet of the fresh product fed by means of a belt conveyor 7, a fluidic chute 4 is situated which begins with a slant top wall 14 and ends with a pour-over threshold 5. On the extension of the fluidic chute a grid conveyor 6 is mounted which embraces the other repeatable units. The beginning of said conveyor is situated in a cascade arrangement in relation to the fluidic chute, immediately behind its pour-over threshold. All repeatable units, the chute and the grid conveyor are located inside a thermally insulated housing 8. A part of the bottom of the fluidic chute is in the form of a grate made of wires 9 which are entered from below by the teeth of cleaning combs 10 arranged below said grate, supported on rolls 11 and connected via a bar 12 with a mechanism 13 which puts them in the to-and-fro motion along the axis of the fluidic chute. The end of the slant top wall 14 is constituted by a comb 15 whose teeth enter from above the spaces between the wires of the grate 9. The chute 4 is supported in a self-aligning way and connected with a device causing its oscillation within the predetermined range.

The principle of operation of the apparatus for an application of the method according to the invention is, as follows: the product to be frozen is fed onto the front part of the fluidic chute 4 by means of the belt conveyor 7. Said is supported on rolls or on slides and performs the to-and-fro motion along the axis of the chute within predetermined limits, and besides, in case of wide chute the conveyor performs a limited rotary motion in a horizontal plane within the angle $\alpha$. In such a way the fresh product is spread over the whole surface of the initial part of the chute, and the wet particles are isolated from the bottom of said chute by a fluidizing layer of an already partially frozen product.

The fan 3 provides for a constant blowing of cooled air through an openwork bottom of the chute 4, maintaining the layer of the product in a fluid state at a self-acting flow of the product from the point of charging towards the pour-over threshold 5. The duration of the flow of the product along the chute 4 constitutes only a small part of the duration of the whole freezing process, preferably 0.1-0.2 of said duration, this being sufficient for proper superficial preliminary freezing of the particles. Said duration is adjusted by means of the height of the adjustable pour-over threshold 5.

Immediately behind the threshold the product falls onto the grid conveyor 6, whereon the layer of the product is blown-through with cooled air from below upwards, however, said layer is not put in a fluid state, i.e. the layer is motionless or only slightly fluffy, without fluidic motion of the particles. Duration of freezing-up of particles to the temperature required by the technology is adjusted by the running speed of the conveyor.

In the course of freezing of very soft and wet products a certain fouling of the bottom of the chute 4 should be expected, therefore the apparatus according to the invention is provided with a system for periodical or continuous cleaning of said bottom, which eliminates laborious entering of the interior of the tunnel housing.

Figures 5, 6:
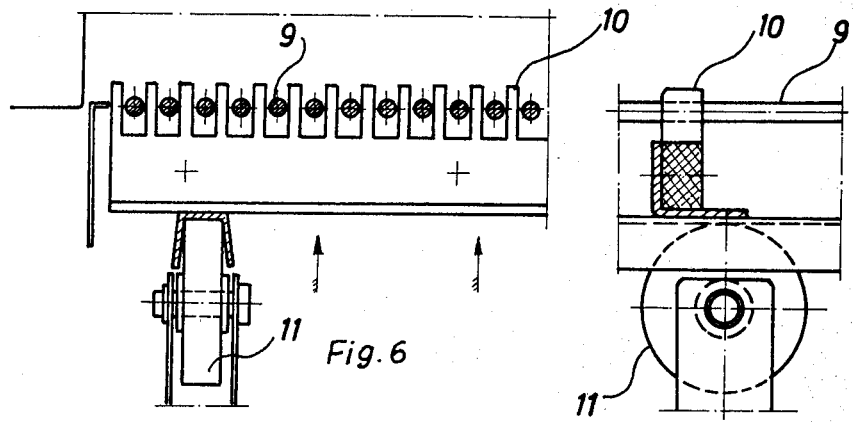

The design and the operation of said system is illustrated in FIGS. 4, 5 and 6. The front part of the bottom of the chute 4, which is most likely to get fouled, is in the form of a grate 9 made of wire. The wires of the grate 9 are arranged along the axis of the chute 4. Under said grate a system of combs 10 is mounted which are made preferably of plastics and whose teeth enter the spaces between the wires of the grate 9 to an inconsiderable depth. The system of the combs 10 is mounted on a frame supported on rolls 11 on which said frame can shift within a determined range along the axis of the chute 4. The frame with the combs 10 is shifted by means of a bar 12 driven by a mechanism 13 which is fitted outside the housing. Usually, the chute is cleaned once or twice every hour. In case of the product of a very bad quality the mechanism 13 may be started more frequently or may operate continuously.

Figure 7:
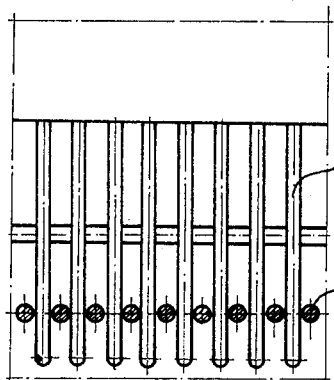
Figure 8:
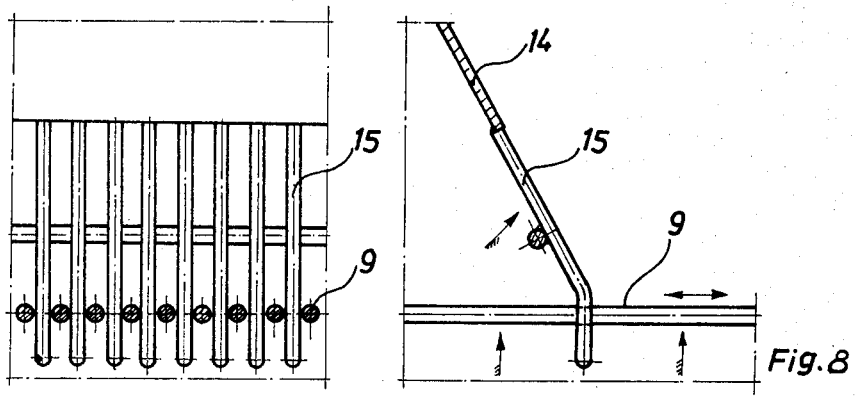

Moreover, in case of oscillation-type chutes having a big oscillation travel, there is a device provided for, which prevents the pressing-in of the product between the bottom of the chute 4 and the base of the top wall 14 fitted at the front of the chute. The operation of said device is illustrated in FIGS. 7 and 8. The lower part of the top wall 14 is in the form of a comb 15 whose teeth enter the spaces between the wires of the grate 9. During the oscillation of the chute 4 the place where the wall 14 contacts with the grate 9 is self-cleaning, and the products are not crushed or pressed out under the chute 4.

The application of the invention results in the following advantages. The number of damages and the volume of losses of the product are reduced by many times, which improves considerably the economy of production, since the losses of the product constitute the largest item of the costs of freezing. Due to an intensification of the heat exchange processes at both stages of the process the duration of freezing is shortened and the output of the apparatus is increased. As compared to the apparata, wherein both stages of the process proceed on belt conveyors, the apparatus according to the invention provides for an increase of the output, which is two or three times bigger, as calculated per one unit of the cubic capacity or of the weight of the apparatus.

As compared to the aforesaid apparatus, the power-consumption rate per one unit of production is approximately two times lower.

The frozen product is completely loose, free of clods, of good appearance and of good commercial value, and meets the requirements as specified by IQF, i.e. Individual Quick Frozen Product.

The apparatus according to the invention may be used for freezing of products of a considerably varied quality, even of very wet and soft products, such as overripe strawberries, whereas the quality of the product does not have any substantial influence upon the output of the apparatus.

The method of and the apparatus for freezing according to the invention may be used for freezing of a wide range of fruit and vegetable products, such as strawberries, raspberries, plums, currants, gooseberries, blueberries, green peas, beans, chips, broccolis, cauliflower segments, tomatoes, diced carrots and other. They may be also used for freezing of fine cooking products, such as noodles, dumplings, raviolis.

What is claimed is:

1. An apparatus for continuous freezing of food products in bulk, comprising an insulated housing, a series of cooling units within said housing in side-by-side relationship, each of said cooling units including an air cooler and means for causing an upward flow of air from said air coolers, a longitudinally extending foraminous surface spaced above at least the first cooling unit such that in operation of the apparatus a fluidized bed of the food product is formed above said foraminous surface, and means for feeding the unfrozen food product to said fluidized bed, the improvement wherein said feed means comprises a belt conveyor which extends within said housing above said foraminous surface, said belt conveyor being disposed substantially parallel to said foraminous surface, said belt conveyor being slidably mounted for to-and-fro motion along the axis of said foraminous surface, and means for imparting said to-and-fro motion to said belt conveyor, and wherein at least the front part of the bottom of the foraminous surface is in the form of a grate made of wire, and a series of cleaning combs are provided beneath said grate, the teeth of said combs being adapted to enter the spaces between the wires of the grate, and means are provided for shifting of the cleaning combs to-and-fro along the axis of the foraminous surface.

2. Apparatus according to claim 1, wherein said belt conveyor is also mounted for rotary motion and said means for imparting to-and-fro motion to said belt conveyor is also adapted to provide rotary motion to said belt conveyor.

3. Apparatus according to claim 1, wherein a slanted wall is provided at the entry end of said first unit, said slanted wall including a comb at its lower end, said comb having teeth which are adapted to enter the spaces between the wires of the grate from above.

4. Apparatus according to claim 1, wherein the discharge end of said foraminous surface is provided with a pour-over threshold and the downstream units from said first unit include a perforated belt conveyor for conveying the food product discharged over said threshold in non-fluidic relation.

* * * * *